United States Patent Office 3,488,970
Patented Jan. 13, 1970

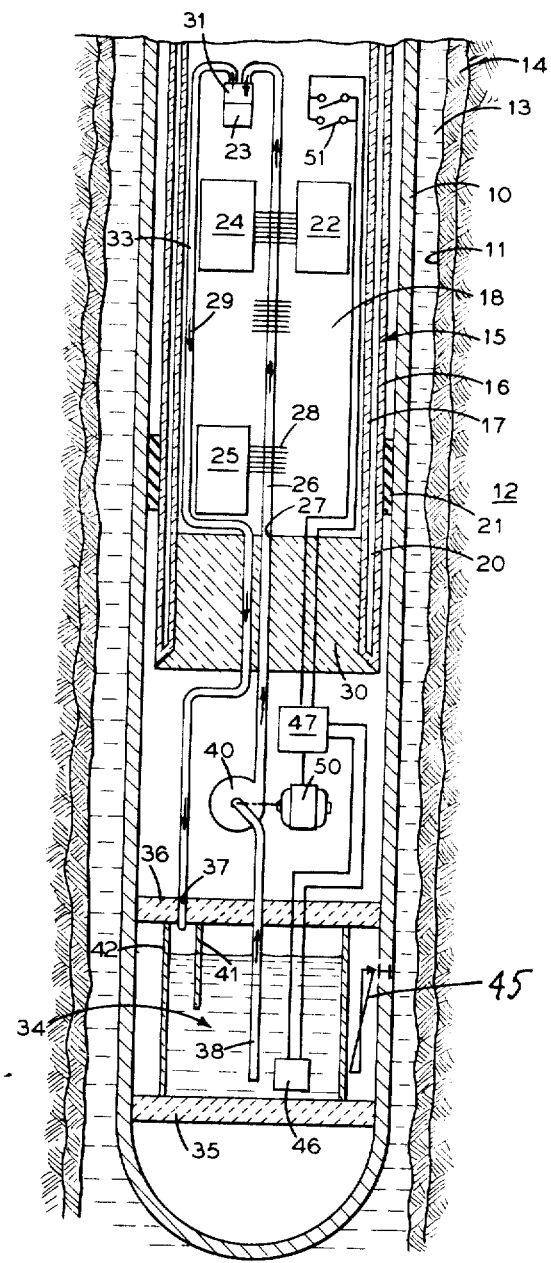

3,488,970
ELECTRICAL APPARATUS
James K. Hallenburg, Fort Worth, Tex., assignor to Schlumberger Technology Corporation, Houston, Tex., a corporation of Texas
Filed Apr. 13, 1967, Ser. No. 630,664
Int. Cl. F25b 21/02; F25d 23/12
U.S. Cl. 62—3
9 Claims

ABSTRACT OF THE DISCLOSURE

In one embodiment of the invention, cooling water from a reservoir within a borehole logging tool is circulated through conduits in a Dewar flask that contains downhole electrical equipment. Thermoelectric cooling modules interposed between the reservoir and the tool housing absorb heat from the cooling water and stabilize the equipment temperature by transferring this waste heat to a higher temperature borehole environment.

BACKGROUND OF THE INVENTION

Field of the invention

This invention relates to borehole logging equipment and more particularly, to methods and apparatus for maintaining the temperature of downhole electrical equipment with predetermined limits, and the like.

Description of the prior art

Frequently, oil production horizons in the earth formations traversed by a borehole are identified through "well logging" techniques. A gamma-gamma log illustrates typical apparatus of this sort. Accordingly, a gamma-gamma logging tool has a source of gamma radiation within a housing for transport through the borehole. The source irradiates the earth formation surrounding the borehole, and a gamma ray detector within the housing produces signals that enable formation characteristics to be determined on the basis of the diffusion, absorption and energy degradation of these emitted radiations. Formation bulk density, for example, is one important earth formation parameter that the gamma-gamma log measures with outstanding reliability.

The electrical equipment, such as power supplies, radiation detector circuits and signal transmission circuits needed to carry out measurements of this sort are enclosed within the housing. In order to provide stable circuit operation, however, these circuits must be protected from the high temperature borehole environment and the heat generated by the electrical equipment during operation. Ideally, circuit temperature for logging equipment of this type ought to be constant and not in excess of 100° C.

Field conditions aggravate this problem because the ambient temperature at the lower depths in many boreholes is substantially higher than 100° C. Consequently, logging tool circuits that generate substantial amounts of heat during operation cannot dissipate this heat through thermal conduction to the borehole environment.

Proposals have been advanced to mitigate this problem by placing the electrical equipment in a Thermos bottle or a Dewar flask within the housing. The Dewar flask ought to provide thermal insulation for electrical equipment from the borehole environment. Autogenous heat can be controlled temporarily, according to these suggestions, by circulating a coolant such as alcohol or acetone through the Dewar flask. Ultimately, the heat absorbing capacity of the coolant is dissipated and the apparatus reaches an equilibrium temperature that is determined largely by the ambient temperature of the borehole. Because borehole temperatures often are twice as high as the desired equipment temperature, the equilibrium temperature established with these proposed non-cyclical cooling systems usually is too high for satisfactory circuit operation through long periods of time.

Consequently, a need exists for a downhole heat pump or cooling system that fits within a logging tool and establishes a stable temperature that is more suited to the operation of electrical equipment, than that which heretofore has been proposed.

Accordingly, it is an object of the invention to provide an improved downhole cooling device.

It is still another object of the invention to provide an improved cooling cycle for a borehole logging tool that extracts heat from equipment within the tool at a low temperature, and discharges that heat to the borehole at a higher temperature during the entire period of tool operation.

SUMMARY

In accordance with the invention, waste heat is removed continuously from downhole electrical equipment by circulating a working substance or collant, such as water, from a reservoir through conduits in a Dewar flask that encases the equipment. The water in the conduits absorbs heat from the electrical equipment and is pumped back to the reservoir where a thermo-electrical cooling module stabilizes the reservoir water temperature by absorbing heat from the reservoir and discharging this heat at a higher temperature to the tool housing and the borehole environment.

Typically, thermoelectric modules are semiconductor devices that pump heat from one face of the module to the other in response to an applied electrical current. Reversing the polarity of the applied current also reverses the direction of heat flow through the module. This phenomenon frequently is called the Peltzer effect, which is explained in terms of some advanced concepts of the solid state of matter.

More particularly, temperature stabilization is established for the electrical equipment through thermostatic upper and lower temperature limit switches that respond to temperature changes in the reservoir or the Dewar flask which are beyond a predetermined range. Thus, for example, as the temperature within the Dewar flask increases above 100° C., the upper limit switch within the flask is operated to energize the circulating pump and increase the coolant flow rate. The thermoelectric module, which is interposed between the reservoir and the logging tool housing, absorbs the heat that is carried from the Dewar flask by the cooling water and transfers this heat to the borehole environment, which can be 200° C. or greater, depending on the capacity of the module.

Alternatively, if the logging tool is exposed to freezing temperatures during transportation to the well site during the winter, and the like, the polarity of the thermoelectric module current can be reversed to heat the coolant and keep it in a liquid state.

The novel features of the present invention are set forth with particularity in the appended claims. The present invention, both as to its organization and manner of operation, together with further objects and advantages thereof, may best be understood by reference to the following description taken in conjunction with the accompanying drawing.

BRIEF DESCRIPTION OF THE DRAWING

A schematic diagram in full section of a portion of a borehole logging tool having a downhole cooling system in accordance with one embodiment of the invention is shown in the sole figure of the drawing.

DESCRIPTION OF THE PREFERRED EMBODIMENTS

An illustrative embodiment of a practical apparatus embracing the principles of the invention is shown in the drawing.

A housing 10 is suspended in the borehole 11 by an armored cable (not shown) which may contain a group of insulated conductors for transmitting signals to the earth's surface that characterize properties of a formation 12. A winch (also not shown) is located at the surface of the earth in order to lower and raise the housing 10 within the borehole 11.

The borehole 11 also contains a drilling fluid 13. The borehole 11, moreover, is lined with a mudcake 14 which usually forms in uncased boreholes when liquids in the drilling fluid 13 invade or seep into the earth formations 12 and deposit a residue of solid matter on the borehole walls.

Because the earth's temperature increases with borehole depth, many boreholes traversing formation of interest have ambient temperatures substantially in excess of 200° C.

The housing 10 encloses a Dewar flask 15 that has an outer wall 16 and an inner wall 17 of silvered glass, or the like. The outer and inner walls 16 and 17 are separated by a vacuum or an evacuated annulus 20. The silvering tends to protect the interior 18 of the flask 15 from radiant heat transfer, while the vacuum 20 between the walls 16 and 17 retards heat conduction from the borehole 11 to the flask interior 18. This structural arrangement provides some thermal isolation for the flask interior 18 from the borehole environment.

An annular support and shock absorbing pad 21 is interposed between the outer wall 16 of the Dewar flask 15 and the inner surface of the steel housing 10. The pad 21 protects the delicate flask and the encased electrical circuits from damage during handling and operation.

Schematically shown within the Dewar flask is a power supply 22 and any suitable radiation detector 23. The radiation detector may be, for example, a scintillation crystal and photomultiplier tube combination or a radiation counter tube, such as a Geiger-Müller tube or a helium 3 ($He^3$) proportional counting tube. Illustratively, the detector 23 shown schematically in the drawing is a cryostat and semiconductor detector assembly, which ordinarily is extremely temperature sensitive. This temperature sensitivity often is mitigated by bathing the solid state detector in liquid nitrogen, hence the need for a cryostat in accordance with present detector technology. At high temperatures within the Dewar flask 15, the liquid nitrogen may boil off too rapidly for effective borehole logging use. Consequently, the heat disposal characteristics of the present invention tend to alleviate this problem and conserve the liquid nitrogen supply in the detector cryostat.

Radiation scattered from the formation 12 to the housing 10 is registered by the detector 23 which produces an electrical signal on a pair of output electrodes (not shown) in response to each detected radiation. This signal is transmitted to the earth's surface through a path that includes a detector circuit 24, a signal transmission circuit 25 (within the flask 15) and the cable (not shown) to the earth's surface. On the earth's surface the signal is analyzed for characteristics of the formation 12.

A finned conduit 26 within the flask interior 18 penetrates an aperture 27 in a Dewar flask closure, or stopper 30. The stopper 30 is formed of thermal insulating material to enhance the thermal isolation of the flask interior 18. The finned conduit circulates cooling water 29 through the flask interior 18 in the direction shown by the arrows to absorb heat generated during the operation of the power supply 22, the detector 23, the detector circuit 24 and the signal transmission circuit 25. The fins 28 on the conduit 26, moreover, improve the heat absorption capabilities of the conduit 26.

A cold finger 31 is in fluid communication with the conduit 26 in order to provide adequate cooling for the detector 23. Typically, the cold finger comprises a hollow, thimble-like structure of copper or silver. The coolant 29 flows into an open end of the finger 31. The detector 23 is in thermal contact with the closed transverse end of the finger 31. Because silver or copper has a low thermal resistivity, the thermal conductivity from the detector 23 through the transverse end of the finger 31 to the coolant 29 is high, and heat absorption is very efficient. The water 29 flows out through a discharge port in the cold finger 31 and through a discharge conduit 33. The discharge conduit 33 penetrates the stopper 30 and enables the water 29 to flow into a reservoir 34.

The reservoir is spaced longitudinally below the Dewar flask 15 and as far from the flask as the size and shape of the housing 10 will permit. Typically, the reservoir comprises a transversely disposed lower block 35 of thermally insulating material and a similarly disposed upper block 36, also of thermally insulating material. The upper block 36 is penetrated by a bore 37 that is near the periphery of the block in order to accommodate the terminal end of the discharge conduit 33.

An intake conduit 38 is received in a bore formed in the center portion of the upper block 36. The intake conduit extends from close to the bottom of the reservoir 34 to the inlet of a pump 40 outside the reservoir 34. A baffle 41 about halfway between the discharge bore 37 and the intake conduit 38 depends from the lower surface of the upper block 36. The baffle 41 causes the warmed water flowing into the reservoir from the discharge conduit 33 to flow against a thermally conductive dike 42 that forms the vertical wall of the reservoir 34, and there deposit heat extracted from the Dewar flask 15. The baffle 41, moreover, facilitates water circulation within the reservoir 34 in order to establish a more uniform water temperature distribution.

In accordance with the invention, a thermoelectric cooling module 45 is interposed between the inner surface of the steel housing 10 and the outer surface of the thermally conductive dike 42. The thermoelectric module 45 is shown symbolically in conformity with the article "When to Specify Thermoelectric Temperature Stabilization" by Peter Lefferts in Electromechanical Design, June 1964, pages 30 to 36.

As hereinbefore mentioned, the module 45 is a device that relies largely on the Peltier effect to extract heat from 100° C. water in the reservoir 34 and discharge this heat into the drilling fluid 13 at temperatures of about 200° C. or more. Generally, when current flows in a circuit containing two different materials, heat is transferred from one junction to the other. Semiconductor junctions using bismuth telluride, for example, are among the more efficient thermoelectric materials. Consequently, by applying an electric current to an array or module of junctions of this sort, heat from the reservoir dike 42 is transferred to the warmer surface of the tool housing 10, whereupon the heat ultimately is dissipated in the borehole 11. Of course, the module 45 must be in thermal conductivity and electrically insulated from the dike 42 and the housing 10. A thin film of alumina ($Al_2O_3$) has been found to provide a satisfactory material for this purpose.

Because most boreholes are logged as the tool is drawn upwardly toward the earth's surface, the reservoir 34 is in the lower portion of the housing 10, as far removed from the Dewar flask 15 as possible. In this situation, heat discharged from the housing 10 will be dissipated in the borehole 11 before it can flow toward the Dewar flask 15.

The temperature of the flask is stabilized by controlling the cooling water flow through the flask interior 18. For this purpose, thermostatic upper and lower temperature limit switches 46 are positioned within the reservoir 34 adjacent to the opening in the intake conduit 38. If the water temperature entering the conduit 38 is, for example, above a predetermined limit of 100° C., the switch 46 is operated to energize a motor control 47. The motor control 47 then starts an electric motor 50 that drives the circulating pump 40 in accordance with the cooling demands of the flask interior 18 as reflected in the intake water temperature.

Conversely, if the temperature of the flask interior 18 falls below a predetermined limit, 98° C. for example, the lower temperature limit switch is operated to energize the motor 50. In this instance, the coolant 29 actually warms the flask interior, and the pump increases the coolant flow through the flask in order to raise the flask temperature to 100° C. Thus, the limit switches 46 stabilize the electrical equipment temperature at a preselected design point. The water 29 within the entire cooling system is, of course, pressurized to more than one atmosphere in order to maintain these temperature limits without permitting the water to boil and form steam. An alternate or parallel set of thermostatic upper and lower temperature limit switches 51 can be located near a "hot spot" or point of maximum temperature within the flask interior. The limit switches 51 may act independently of, or in parallel with, the switches 46 to more closely control the heat balance in the flask interior by manipulating the coolant flow rate through the conduit 26.

After the temperature of the flask interior 18 is returned to 100° C., the switches 46 and 51 are disabled, and cause the motor control to de-energize the motor and stop the pump 40.

During transport to the well site in freezing weather, the polarity of the current applied to the thermoelectric module 45 may be reversed. In this situation, heat is extracted by the thermoelectric module 45 from the colder atmopshere through the housing 10. The heat is discharged at a higher temperature in the reservoir 34 through the dike 42. In this mode of operation, the cooling water 29 is prevented from freezing in adverse weather conditions and the temperature of the electrical equipment remains constant.

Ordinarily, water is a satisfactory working substance or coolant. If, however, a pressurized cooling system is unsatisfactory, or different cooling capacities and temperature ranges are desired, other working substances, such as mercury or liquified gases, may be more suitable.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. A cooling system for a borehole logging tool comprising a housing, a reservoir, a coolant for circulation through said reservoir, a pump in free fluid communication with said reservoir, conduit means in communication with said pump and said reservoir for circulating said coolant and cooling an interior portion of the borehole logging tool, and thermoelectric cooling means associated with said reservoir and said housing for transferring heat from said coolant and said reservoir during logging.

2. A cooling system according to claim 1 comprising a Dewar flask encasing at least a portion of said conduit means.

3. A temperature stabilizing device for use in a borehole logging tool during logging operation comprising a housing, a working substance, a reservoir within said housing for said working substance, a pump associated with said reservoir for circulating at least a portion of said working substance through the logging tool for heat transfer therein, and a Peltier effect device for transferring heat between said working substance and said housing during logging operation.

4. A temperature stabilizing device according to claim 3 comprising conduit means in fluid communication with said pump and said reservoir for circulating said working substance therethrough.

5. A temperature stabilizing device according to claim 3 comprising temperature sensitive means responsive to said working substance for driving said pump and circulating said working substance through the logging tool.

6. Cooling apparatus for a logging tool comprising a housing, a reservoir within said housing, thermoelectric cooling means interposed between said reservoir and said housing, a pump in fluid communication with said reservoir, a conduit connected to said pump and said reservoir, a working substance within said reservoir for circulation by said pump through said conduit, a Dewar flask enclosing at least a part of said conduit for cooling by said working substance therein, a motor for driving said pump, and thermostatic means for energizing said motor and said pump in response to temperature fluctuations within said Dewar flask during logging operation.

7. Cooling apparatus according to claim 6 wherein said thermostatic means comprises thermostatic upper and lower limit switches within said reservoir.

8. Cooling apparatus according to claim 6 wherein said working substance comprises water.

9. A cooling system for a borehole logging tool comprising a thermally conductive housing, a pair of substantially parallel blocks of thermally non-conductive material transversely disposed within said housing, a thermally conductive longitudinal dike interposed between said blocks in fluid-tight engagement therewith and spaced inwardly of said housing, a thermoelectric module in thermal contact with said dike and said housing, a Dewar flask longitudinally spaced from said thermally non-conductive blocks, water, conduit means for carrying said water between said fluid-tight dike and said Dewar flask for removing heat therefrom, a pump in fluid communication with said conduit means for circulating said water in said conduit means, and a thermostatic switch responsive to said water temperature for energizing said pump.

References Cited

UNITED STATES PATENTS

| 2,671,323 | 3/1954 | Richert | 62—259 |
| 2,714,169 | 7/1955 | Armistead | 62—514 X |
| 2,782,318 | 2/1957 | Herzog | 250—71.5 |
| 3,038,074 | 6/1962 | Scherbatskoy | 250—71.5 |
| 3,054,840 | 9/1962 | Alsing | 62—3 |
| 3,154,926 | 11/1964 | Hirschhorn | 62—3 |
| 3,192,725 | 7/1965 | Britton | 62—3 |
| 3,265,893 | 8/1966 | Rabson | 62—3 |
| 3,287,923 | 11/1966 | Slfveng | 62—3 |

WILLIAM J. WYE, Primary Examiner

U.S. Cl. X.R.

62—259; 250—71.5